United States Patent
Gregory-Brown et al.

(10) Patent No.: US 8,540,566 B2
(45) Date of Patent: Sep. 24, 2013

(54) SYSTEM AND METHOD FOR PRESENTING A GAME SPACE WITH DISCOVERABLE ITEMS TO BE PROSPECTED

(75) Inventors: Bengt Gregory-Brown, Springfield, OH (US); Derek Harp, San Mateo, CA (US); Brad McQuaid, Vista, CA (US)

(73) Assignee: Maslow Six Entertainment, Inc., San Mateo, CA (US)

( * ) Notice: Subject to any disclaimer, the term of this patent is extended or adjusted under 35 U.S.C. 154(b) by 359 days.

(21) Appl. No.: 13/115,867

(22) Filed: May 25, 2011

(65) Prior Publication Data
US 2012/0302335 A1  Nov. 29, 2012

(51) Int. Cl.
*G06F 17/00*  (2006.01)
(52) U.S. Cl.
USPC ............... 463/25; 463/16; 463/20; 463/42
(58) Field of Classification Search
USPC .......................... 463/25, 16, 42, 20
See application file for complete search history.

(56) References Cited

U.S. PATENT DOCUMENTS

| | | | |
|---|---|---|---|
| 6,261,177 B1 * | 7/2001 | Bennett | 463/16 |
| 6,309,299 B1 * | 10/2001 | Weiss | 463/20 |
| 6,645,071 B2 * | 11/2003 | Perrie et al. | 463/16 |
| 7,175,523 B2 * | 2/2007 | Gilmore et al. | 463/16 |
| 8,043,153 B2 * | 10/2011 | Ross et al. | 463/16 |
| 8,079,903 B2 * | 12/2011 | Nicely et al. | 463/20 |
| 8,167,714 B2 * | 5/2012 | Tawara et al. | 463/30 |
| 8,287,364 B2 * | 10/2012 | Caputo et al. | 463/26 |
| 8,393,968 B2 * | 3/2013 | Nicely et al. | 463/42 |
| 2001/0056383 A1 | 12/2001 | Shuster | 705/27 |
| 2003/0199293 A1 | 10/2003 | Skripachev et al. | |
| 2005/0054415 A1 * | 3/2005 | Kaminkow et al. | 463/16 |
| 2006/0030387 A1 * | 2/2006 | Jackson | 463/16 |
| 2006/0073874 A1 * | 4/2006 | Cregan et al. | 463/20 |
| 2006/0079331 A1 | 4/2006 | Moshal | 463/42 |
| 2006/0178970 A1 | 8/2006 | Jung et al. | 705/35 |
| 2007/0155485 A1 * | 7/2007 | Cuddy et al. | 463/25 |
| 2008/0293478 A1 * | 11/2008 | Anderson et al. | 463/25 |
| 2010/0167824 A1 * | 7/2010 | Walker et al. | 463/42 |
| 2010/0173689 A1 * | 7/2010 | Ansari et al. | 463/16 |

OTHER PUBLICATIONS

Wikipedia, the Free Encyclopedia, "Minesweeper (Video Game)", downloaded Apr. 25, 2011.
Bulbapedia, The Community-driven Pokemon Encyclopedia, "Voltorb Flip", downloaded Apr. 4, 2011.
Wikipedia, the Free Encyclopedia, "Minecraft", pp. 1-9, downloaded Apr. 26, 2011.
"Minecraft Forums", http://www.minecraftforum.net/veiwtopic.php?f=24&T=2466&view=unread, pp. 1-14, downloaded Apr. 26, 2011.

* cited by examiner

*Primary Examiner* — Michael Cuff
(74) *Attorney, Agent, or Firm* — Pillsbury Winthrop Shaw Pittman LLP

(57) ABSTRACT

A game space may be provided to a user in which the user attempts to obtain discoverable items that have been associated with individual zones in the game space. The user may attempt to obtain the items through strategically employing one of a plurality of selectable actions that are associated with different costs in the game space. The costs of the actions may be balanced to create a prospecting mechanic within the game. The game space may be provided to the user as a discrete game, or as one or more mini-game(s) within a larger game or virtual space.

22 Claims, 5 Drawing Sheets

SYSTEM AND METHOD FOR PRESENTING A GAME SPACE WITH DISCOVERABLE ITEMS TO BE PROSPECTED

FIELD OF THE INVENTION

The invention relates to a system and method for presenting a game space to a user in which the user attempts to obtain discoverable items that have been associated with individual zones in the game space through strategically employing one of a plurality of selectable actions that are associated with different costs in the game space.

BACKGROUND OF THE INVENTION

Games in which an array of zones in a game space include zones that are associated with discoverable items are known. Such examples include games in which the items are to be avoided (e.g., minesweeper), and games in which the items are resources to be obtained or harvested in the game in other contexts (e.g., Minecraft). However, in these conventional games, users are either given no guidance as with respect to which zones are associated with items, or guidance within rigid guidelines that require guessing and/or impede strategy.

SUMMARY

One aspect of the invention relates to a system and method for presenting a game space to a user in which the user attempts to obtain discoverable items that have been associated with individual zones in the game space. The user may attempt to obtain the items through strategically employing one of a plurality of selectable actions that are associated with different costs in the game space. The costs of the actions may be balanced to create a prospecting mechanic within the game. The game space may be provided to the user as a discrete game, or as a mini-game within a larger game or virtual space.

In some implementations, the system may include a processor configured to execute computer program modules. The computer program modules may include one or more of a game space module, an item module, a resource module, an action selection module, a zone selection module, a selection result module, and/or other modules.

The game space module may be configured to determine a view of the game space for presentation to a user. The view of the game space may be presented to the user via a client computing device. In the view, the game space may be segmented into an array of separate zones. The array of separate zones may include two-dimensional zones and/or three-dimensional zones.

The item module may be configured to associate discoverable items with individual zones in the view of the game space. Prior to discovery by a user, the locations of the items associated with individual zones in the game space may be hidden in the view of the game space generated by game space module 16. Discovering the locations of the items, and/or obtaining the items may be an object of a game or mini-game played in the game space. The discoverable items may include, for example, resources usable in a game the game space forms a part of, virtual items or objects, points or virtual currency, and/or other items. In some implementations, the items may include resource (e.g., virtual minerals, virtual ores, virtual herbs, virtual gems, and/or other resources) usable in a game as ingredients and/or articles of trade, or for other purposes. The items may include items that are more rare and/or items that are less rare.

The item module may be configured to associate a relatively limited number of items with zones, such that the majority of zones in the game space are not associated with an item. In some implementations, as items are obtained by one or more users through gameplay, additional items may be associated with zones to replace the obtained items. This may include associating an additional item as an item is obtained, associating additional items to replace obtained items over time, and/or other replacement techniques.

The resource module may be configured to maintain an accounting of a rechargeable resource available to users and/or user characters associated with the users. The rechargeable resource may recharge over time, may be recharged with a virtual potion, spell, or healing in the game space, may be recharged by purchase with virtual currency, and/or recharged in other ways. The rechargeable resource may include, for example, manna, health, energy, and/or other rechargeable resources. The rechargeable resource may be expendable within the game space to perform certain activities. As used herein, "recharging" with respect to the rechargeable resource may include replenishing, growing, increasing, revitalizing, and/or other recharging actions.

The action selection module may be configured to receive selection of an action to be performed on a zone of the game space from among a set of potential actions. The set of potential actions may include actions that either (i) provide the user with information about the items associated with zones of the game space, and/or (ii) result in the user obtaining an item. The set of potential actions may include a locator action, an identifier action, a harvesting action, one or more combination actions (e.g., some combination of locator, identifier, and/or harvesting), and/or other actions.

Individual ones of the potential actions may be associated with costs. The costs may be payable in the rechargeable resource. If a given action is associated with a cost, the cost may be collected from a user in the game space by deducting an amount of the rechargeable resource from the user (or a user character associated with the user) dictated by the cost.

Selection of an action from the set of potential actions may include a selection of a virtual tool from a set of virtual tools available to a user or user character in the game space. A given virtual tool in the set of virtual tools may correspond to one of the potential actions. In some implementations, a user or user character must have the given virtual tool in his inventory in order to select the given virtual tool.

The zone selection module may be configured to receive selection of a zone of the games space on which a selected action should be performed. The selection may be received from a user. The selection of a zone may indicate that a previously selected action should be performed on and/or with respect to the selected zone.

The selection result module may be configured to determine a result of a selected action on a selected zone. The result may include a primary effect, collection of a cost, and/or other effects. Collection of the cost may include determining the cost for actions with costs that vary between turns (e.g., increasing or decreasing over time, varying stochastically, and/or changing between turns in other ways). Determining the result may include determining a primary effect of the action. The primary effect of the action may include providing information in the view of the game space about an item associated with a zone in the game space (e.g., the selected zone, a nearby zone, and/or other zones), awarding an item to the user in the game space, and/or other effect. The primary effect may be a function of the action selected, the zone selected, whether the selected zone is associated with an item, and/or other factors.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
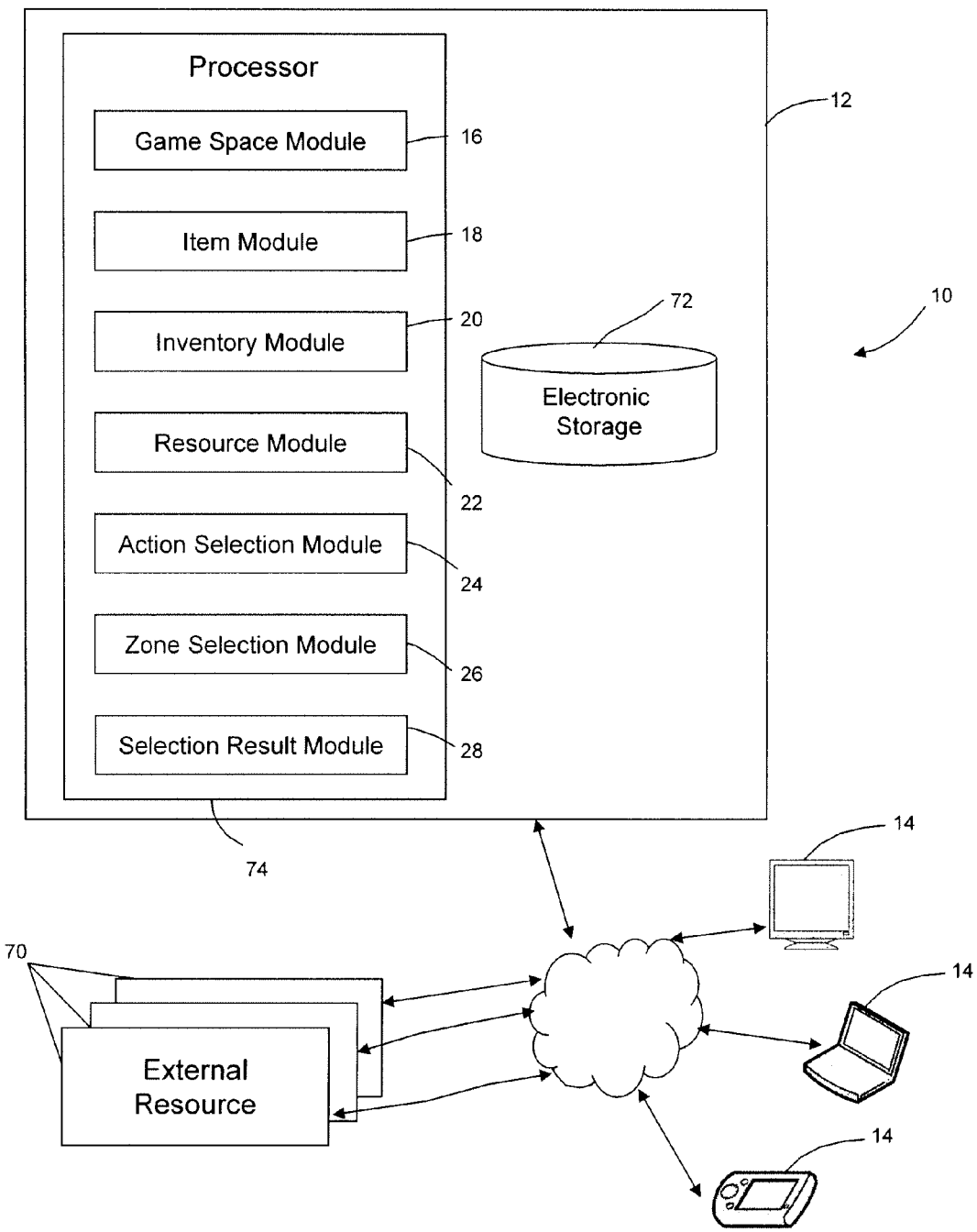
FIG. 1 illustrates a system configured to provide an electronic game to one or more users.

FIG. 1 illustrates a system 10 may be configured to provide an electronic game to one or more users. This may include hosting a game space or virtual space within which the game may take place. The game space or virtual space may be hosted over a network. In some implementations, system 10 may include a server 12. The server 12 may be configured to communicate with one or more client computing platforms 14 according to a client/server architecture. The users may access system 10 and/or the virtual [environment/space] via client computing platforms 14.

The server 12 may be configured to execute one or more computer program modules. The computer program modules may include one or more of a game space module 16, an item module 18, an inventory module 20, a resource module 22, an action selection module 24, a zone selection module 26, a selection result module 28, and/or other modules.

The game space module 16 may be configured to determine views of one or more game spaces for presentation to users of system 10. The views may be communicated from server 12 to client computing platforms 14 for presentation to the users. The game space may be a 2 dimensional or 3 dimensional space. In implementations in which the game space is 2 dimensional, the game space may be an isometric space, a top-down space, a profile or side-scrolling space, and/or other spaces. The game space may be divided into an array of separate zones. The zones may have regular and/or irregular shapes. The shape(s) of the zones may include one or more of rectangle, square, triangle, polygon, and/or other shapes. The boundaries of the zones may be depicted in the views of the game space determined by game space module 16. The array may cover an entire view of the game space and/or a view may include parts of the game space that are divided into zones and parts of the game space that are not divided into zones.

The game space may be depicted as a game board (e.g., a checkerboard, a boardgame board, and/or other game boards), a simulated space (e.g., a simulated physical space having physics, gravity, and/or other features of a simulated space), and/or may be depicted in other ways. The game space for which views are determined by game space module 16 may be a subspace of a larger virtual space. The game space may form a mini-game within the larger virtual space. The game space may be a standalone space that does not connect to, and/or is not otherwise associated with a larger virtual space. The game space may be persistent. For example, actions taken in the game space by a user may be reflected in the views of the game space even after the user is no longer viewing and/or otherwise interacting with the game space. In some implementations, the game space may not be persistent. The game space may be synchronous and/or asynchronous between users. If the game space is synchronous, game space module 16 may be configured to enable a plurality of users to interact simultaneously within a single instance of the game space. This may include enabling users to interact with each other and/or the game space simultaneously within the same instance of the game space.

Figure 2:
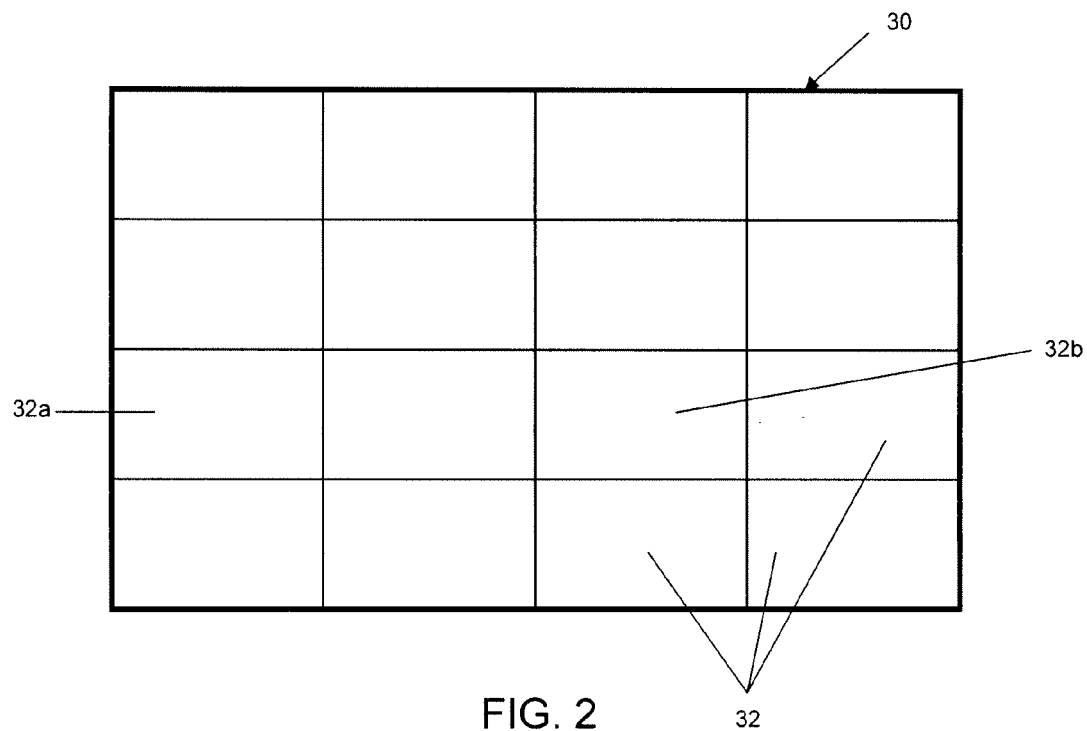
FIG. 2 illustrates view of a game space.

By way of illustration, FIG. 2 depicts a view 30 of a game space. The game space in view 30 may be divided into an array of separate zones 32.

Turning back to FIG. 1, item module 18 may be configured to associate discoverable items with individual zones in the game space. Prior to discovery by a user, the locations of the items associated with individual zones in the game space may be hidden in the view of the game space generated by game space module 16. Discovering the locations of the items, and/or obtaining the items may be an object of a game or mini-game played in the game space. The discoverable items may include, for example, resources usable in a game the game space forms a part of, virtual items or objects, points or virtual currency, and/or other items. In some implementations, the items may include resource (e.g., virtual minerals, virtual ores, virtual herbs, virtual gems, and/or other resources) usable in a game as ingredients and/or articles of trade. The items may include items that are more rare and/or items that are less rare.

The item module 18 may be configured to associate a relatively limited number of items with zones, such that the majority of zones in the game space are not associated with an item. In some implementations, as items are obtained by one or more users through gameplay, additional items may be associated with zones to replace the obtained items. This may include associating an additional item as an item is obtained, associating additional items to replace obtained items over time, and/or other replacement techniques. In implementations in which additional items to replace obtained items are associated with zones gradually over time, item module 18 may be configured to maintain the number of associated items at or near a specific level. This may be accomplished, for example, by setting a maximum number of associated items in the game space, reducing a rate at which additional items are associated with zones as the number of currently associated items increases, and/or other mechanisms for maintaining the number of associated items at a specific level.

As an additional item is associated with a zone to replace an obtained item, the additional item may be of the same item type as the obtained item, or the additional item may be of a different item type. For example, the item type of the additional item may be determined stochastically, or may be determined deterministically based on the item type of the obtained item. For implementations in which item type is determined stochastically, the stochastic determination may be influenced or constrained by scarcities assigned to the potential item types. The higher a scarcity assigned to a given item type, the less likely it is that an additional item being associated with a zone will have the given item type. The assigned scarcities may be dictated by a location of the game space within a larger virtual space or game (e.g., location of a mini-game corresponding to the game space in a map of a larger virtual or game space). The assigned scarcities may be static for the game space. The assigned scarcities may be dynamic over time. For example, the assigned scarcities may vary as a function of time of day, week, month, year, and/or other period in the real world, as a function of time of day, week, month, year, and/or other time period in the game space, and/or other temporal parameters. The assigned scarcities may vary over time as a function of one or more user parameters or user character parameters (e.g., skill level, faction, guild, usage level, and/or other user or user character parameters).

In some implementations, rather than replacing obtained items with additional items, item module 18 may be configured to newly associate a set of items with individual ones of the zones for individual sessions within the game space. For example, responsive to a user accessing the game space, item module 18 may associate a first set of items with individual zones within the game space. The number of items in the first set of items, the location of the zones with which the items are associated, and/or other aspects of the assignment of the items to zones in the game space may be determined deterministically and/or stochastically. Responsive to the user ending the session in the game space, the associations of the first set of items with zones in the game space may be discarded or otherwise terminated. Responsive to the user (or another user) beginning a second session in the game space, item module 18 may be configured to associate a second set of items with individual zones within the game space.

Figure 3:
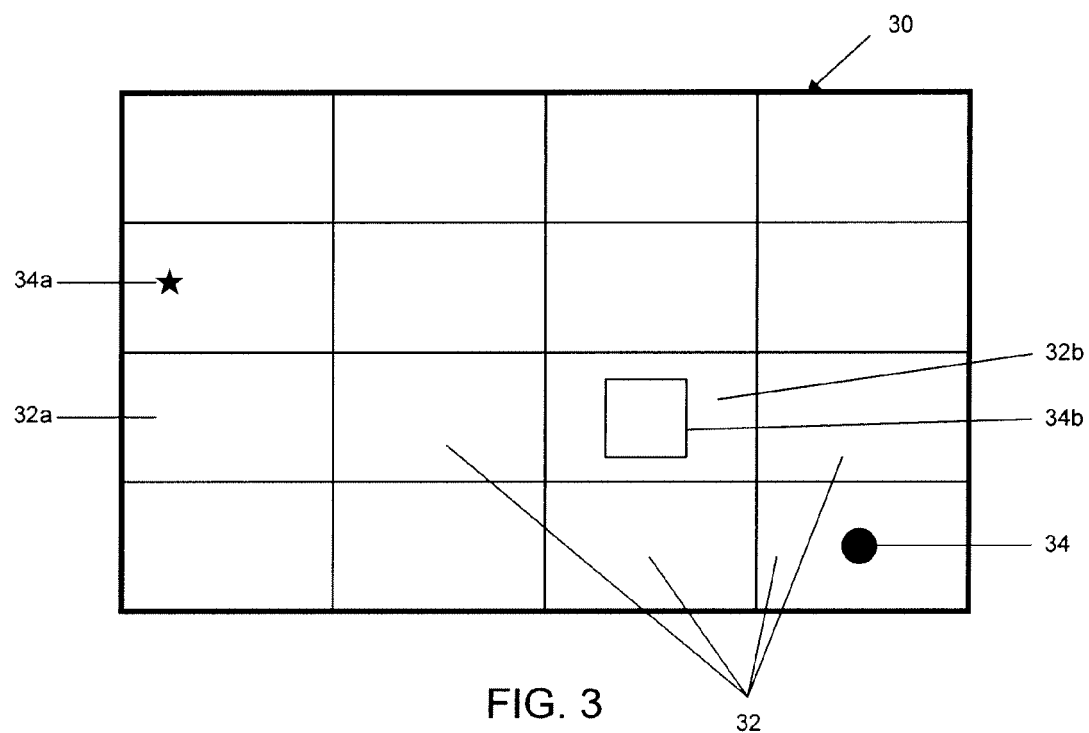
FIG. 3 illustrates view of a game space.

An exemplary illustration of an association of items with zones in the game space is provided, in FIG. 3. In FIG. 3, view 30 includes zones 32. Items 34 may be associated with individual ones of zones 32. Items 34 may include a first item 34a, a second item 34b, and/or other items 34. The first item 34a may be of a first item type. The second item 34b may be of a second item type. Although items 34 may be visible in view 30, this is for illustrative purposes. Prior to a user commencing play, the zones 32 associated with items 34 and/or the item types of items 34 may not be represented in view 30.

The inventory module 20 may be configured to manage inventories associated with the users. These may include inventories associated with user characters controlled by the users, inventories associated with accounts of the users, and/or other inventories associated with the users. The inventories may include virtual objects and/or items usable in the game space, and/or in a virtual space or larger game space the game space is a part of. The virtual objects may be wearable, bearable, storable, tradable, sellable, transferrable, destroyable, usable, inhabitable, ridable, ingestible, and/or disposable. The virtual objects may include one or more of a rare object, an object with abilities, an ingredient, a virtual mineral or ore, a virtual herb, leaf, stem, seeds or root, a protective object, a tool, a weapon, a pet, a vehicle, a mount, and/or other objects. An inventory associated with a user character may include the total inventory the user character controls, and/or a subset of the total inventory which may be immediately available to the user character (e.g., currently being carried by the user character).

The resource module 22 may be configured to maintain an accounting of a rechargeable resource available to users and/or user characters associated with the users. The rechargeable resource may recharge over time, may be recharged with a virtual potion, spell, or healing in the game space, may be recharged by purchase with virtual currency, and/or recharged in other ways. The rechargeable resource may include, for example, manna, health, energy, and/or other rechargeable resources. The rechargeable resource may be expendable within the game space to perform certain activities. It will be appreciated that the activities described herein having a cost payable in the rechargeable resource may not be the only activities performed through payment of the rechargeable resource. For example, in implementations in which the game space of which views determined by game space module 16 forms a mini-game within a larger virtual or game space, the rechargeable resource may be required to perform other activities within the larger virtual or game space. The current level of the rechargeable resource for a given user and/or a user character associated with the given user may be presented to the given user in the view of the game space determined for the given user by game space module 16. This information may be represented by a status bar, a numerical indicator, and/or other representations.

The action selection module 24 may be configured to receive selection of an action to be performed on a zone of the game space from among a set of potential actions. The selection may be received from a user (e.g., via one of client computing platforms 14). The set of potential actions may include actions that either (i) provide the user with information about the items associated with zones of the game space, and/or (ii) result in the user obtaining an item. The set of potential actions may include a locator action, an identifier action, a harvesting action, one or more combination actions (e.g., some combination of locator, identifier, and/or harvesting), and/or other actions. An identifier action may identify an item type of an item. A locator action may provide a hint or indication of a location of an item in the game space. A harvesting action may result in a user performing the action obtaining an item being harvested.

Individual ones of the potential actions may be associated with costs. The costs may be payable in the rechargeable resource. If a given action is associated with a cost, the cost may be collected from a user in the game space by deducting an amount of the rechargeable resource from the user (or a user character associated with the user) dictated by the cost. Costs may be predetermined, vary over time (e.g., increasing or decreasing), vary stochastically between uses, and/or be determined in other ways.

Selection of an action from the set of potential actions may include a selection of a virtual tool from a set of virtual tools available to a user or user character in the game space. A given virtual tool in the set of virtual tools may correspond to one of the potential actions. In some implementations, a user or user character must have the given virtual tool in his inventory in order to select the given virtual tool. A given tool may be reusable or non-reusable. A reusable tool may be reusable for a definite or indefinite period of time, reusable for a finite number of uses, reusable for an infinite number of uses, and/or reusable for other numbers of uses. One or more of the accuracy, efficiency, durability, and/or other tool characteristics may vary between tools. For example, one locator or identifier tool may have a higher degree of accuracy in its function (e.g., location and/or identification). A tool of a certain type may have a higher efficiency than another tool of the same type if its cost is less than the other tool. The durability of a tool may be higher if it is reusable for a higher number of uses. One or more of the tool characteristics for a given tool may vary (e.g., erode) over a number of uses. For example, the efficiency of the given tool may erode use after use until the efficiency is reset. The resetting of tool characteristics may be associated with a cost. The cost may be payable in virtual currency, may be payable in time spent in maintenance of the tool (e.g., sharpening a virtual pickaxe), and/or payable in other forms.

The zone selection module 26 may be configured to receive selection of a zone of the games space. The selection may be received from a user (e.g., one of client computing platforms 14). The selection of a zone may indicate that a previously selected action should be performed on and/or with respect to the selected zone.

The selection result module 28 may be configured to determine a result of a selected action on a selected zone. The result may include a primary effect, collection of a cost, and/or other effects. Collection of the cost may include determining the cost for actions with costs that vary between turns (e.g., increasing or decreasing over time, varying stochastically, and/or changing between turns in other ways). Determining the result may include determining a primary effect of the action. The primary effect may be a function of the action selected, whether or not the selected zone has been associated with an item by item module 18, and/or other parameters.

The selection result module 28 may be configured such that for a locator action, responsive to the selected zone not being associated with an item, a hint may be provided in the view determined by game space module 16 indicating another zone in the game space that has been associated with an item. This hint (or indicator) may indicate a specific zone that has been associated with an item, may indicate a general direction of another zone that has been associated with an item, may indicate a distance to another zone that has been associated with an item, and/or may include other hints. The selection result module 28 may be configured such that for a locator action, responsive to the selected zone being associated with an item, a hint may be provided in the view of the game space that the selected zone has been associated with an item. The hint may provide no information, or some information, regarding the type of item associated with the selected zone. Selection of a locator action may not enable the user to obtain an item associated with a zone in the game space (e.g., at the selected zone and/or other zones).

In some implementations, responsive to the selected zone is within a threshold distance to another zone that has been associated with an item (e.g., within a threshold number of zones), the hint may indicate the specific zone associated with an item. Responsive to the selected zone not being within a threshold distance to another zone that has been associated with an item, the hint may merely indicate a direction of some other zone that has been associated with an item, or not hint may be provided at all. The threshold distance may be a function of the type of locator action selected. For example, more expensive and/or rare locator actions (or virtual tools) may have a larger threshold distance than less expensive and/or rare locator actions (or virtual tools).

The reliability of a hint determined by selection result module 28 may be less than 100%. In other words, selection result module 28 may be configured to stochastically generate hints that are false or misleading. The probability that a given hint is reliable may be impacted by one or more of a distance between a selected zone and another zone associated with an item, a specific locator action or virtual tool (e.g., more expensive or rare actions/tools may generate hints that are more reliable), and/or other factors.

Figure 4:
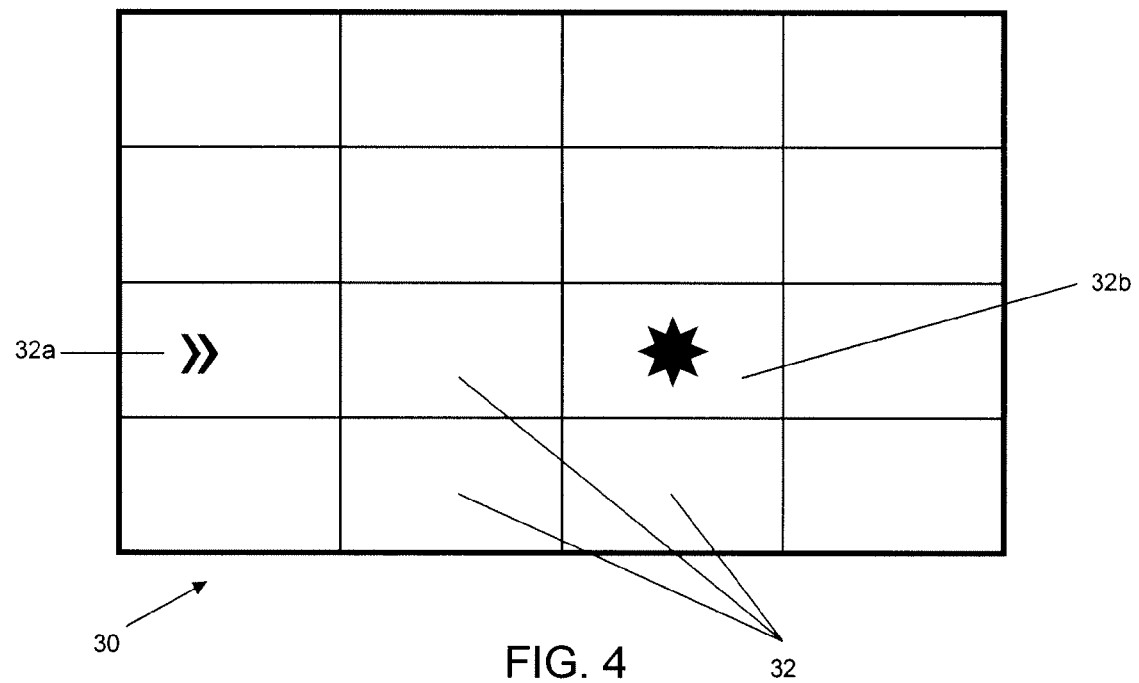
FIG. 4 illustrates view of a game space.

By way of illustration, FIG. 4 depicts view 30 in which a particular zone 32a has been selected by a user for a locator action. Since zone 32a has not been associated with an item, a hint 36 may be presented in view 30. Hint 36 may be presented in zone 32a, adjacent to zone 32a, separate from zone 32a, and/or at other locations in view 30. Hint 36 may indicate a general direction of another zone 32b that has been associated with an item, a distance to zone 32b, and/or other information with respect to zone 32b. Responsive to the user selecting zone 32b for the locator action, a hint 38 may be presented in view 30 that indicates that zone 32b has been associated with an item.

Returning to FIG. 1, selection result module 28 may be configured such that for an identifier action, responsive to a selected zone being associated with an item, a hint may be provided in the view of the game space generated by game space module 16 that indicates information about the specific item associated with the selected zone. Such information may include an item type, an item class, an item value, an item scarcity or availability, a cost to obtain the item, and/or other information. The selection module 28 may be configured such that for an identifier action, responsive to a selected zone not being associated with an item, a hint may be provided in the view of the game space that no item is associated with the zone, not hint may be provided, and/or some other hint may be provided.

Figure 5:
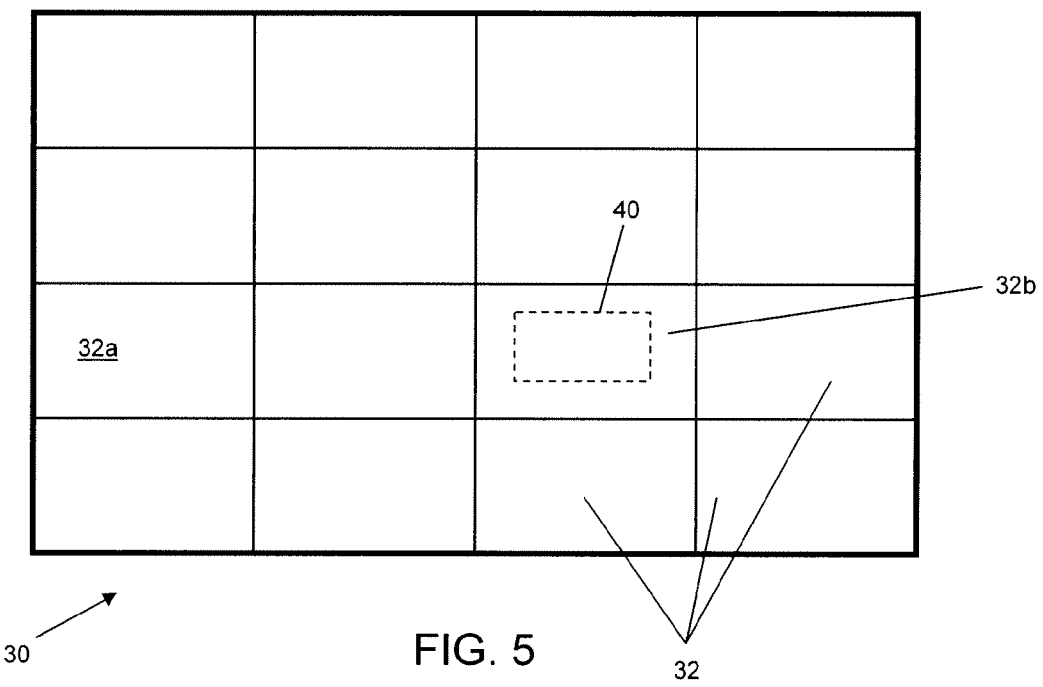
FIG. 5 illustrates view of a game space.

By way of illustration, FIG. 5 depicts view 30 of the game space. In view 30, responsive to zone 32a (which has not been associated with an item) being selected for an identifier action, no hint may be presented to the user. Responsive to zone 32b (which has been associated with an item) being selected for an identifier action, a hint 40 may be presented in view 30 indicating information about the item associated with zone 32b. The color, size, visual symbols, motion, text, and/or other characteristics of hint 40 may indicate information about the item associated with zone 32b.

Referring back to FIG. 1, selection result module 28 may be configured such that for a harvesting action, responsive to a selected zone being associated with an item, the item is awarded to the user in the game space. This may include adding the item to an inventory or account associated with the user and/or a user character of the user. Responsive to the selected zone not being associated with the item, no item may be awarded to the user in the game space.

Figure 6:
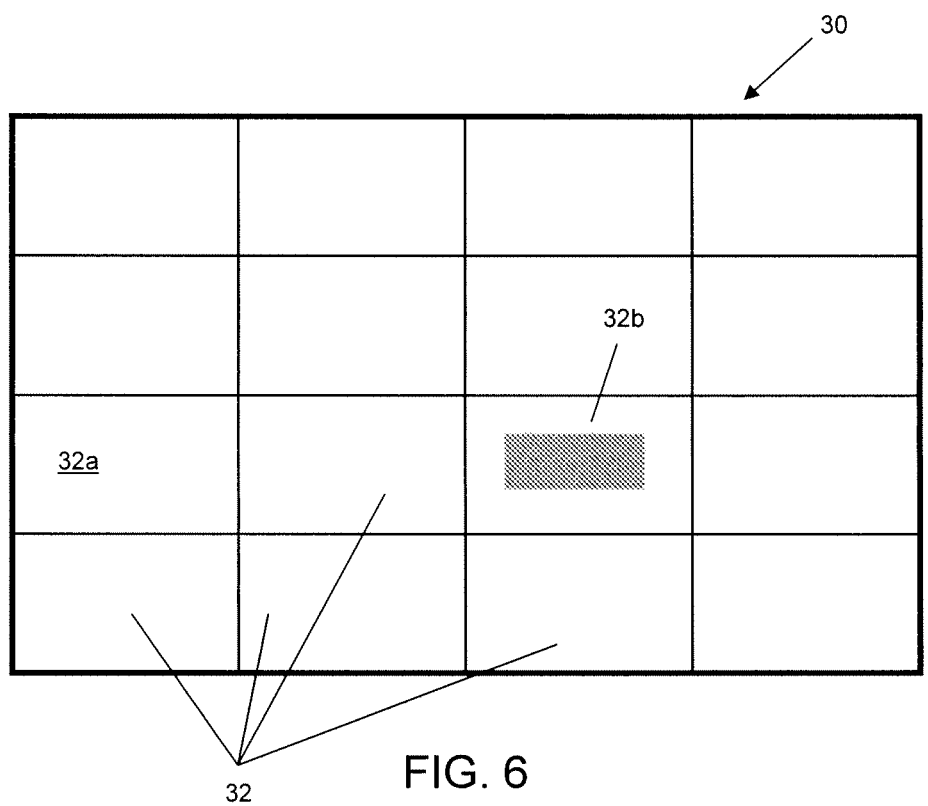
FIG. 6 illustrates view of a game space.

By way of illustration, FIG. 6 illustrates view 30 of the game space in which zones 32a and 32b have been selected with a harvesting action. Since zone 32a has not been associated with an item, selection of zone 32a may not result in the user being awarded with an item in the game space. Since zone 32b has been associated with an item, selection of zone 32b may result in the item associated with zone 32b being awarded to the user in the game space. The harvesting of the item from zone 32b may be reflected in view 30.

Referring back to FIG. 1, selection result module 28 may be configured to collect the cost of the selected action from the user in the game space responsive to performance of the selected action on a selected zone. This may include deducting an amount of the rechargeable resource from the user in the game space. As has been set forth above, the cost of a specific action may be based on the type of action selected, the efficiency and/or effectiveness of the action selected, and/or other factors. In some implementations, locator and/or identifier actions may have lower costs than harvesting action(s). This may incentivize the use of the locator and/or identifier actions strategically to locate and/or assess the value of items in the game space before attempting to obtain the items. The costs and/or reliability of the hints provided by the locator and/or identifier actions may be balanced to reward strategic decision making by the user in attempting to obtain items while minimizing expenditure of the rechargeable resource.

The description herein of locator, identifier, and/or harvesting actions as being completely separate is not intended to be limiting. One or more actions may be individually selectable by the user that provide some or all of the functionality attributed herein to two or more of the locator, identifier, and/or harvesting actions. For example, such actions may be associated with upgraded or more rare/expensive virtual tools in the game space. The description of visual hints provided the locator and/or identifier actions is not intended to limiting. One or more audio (or other sensory) hints may be provided in addition to and/or in place of the visual hints described and/or illustrated without departing from the scope of this disclosure. The game provided by system 10 may be played as a single-player experience and/or as a multi-player experience. In multi-player implementations, the users may be adversarial and/or cooperative. Multi-player implementations may include turn-based control, real-time control, and/or other control schemes.

In some implementations, the server 12, client computing platforms 14, and/or external resources 70 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 12, client computing platforms 14, and/or external resources 70 may be operatively linked via some other communication media.

A given client computing platform 14 may include one or more processors configured to execute computer program modules. The computer program modules may be configured to enable an expert or user associated with the given client computing platform 14 to interface with system 10 and/or external resources 70, and/or provide other functionality attributed herein to client computing platforms 14. By way of non-limiting example, the given client computing platform 14 may include one or more of a desktop computer, a laptop computer, a handheld computer, a NetBook, a Smartphone, a gaming console, and/or other computing platforms.

The external resources 70 may include sources of information, hosts and/or providers of virtual environments outside of system 10, external entities participating with system 10, and/or other resources. In some implementations, some or all of the functionality attributed herein to external resources 70 may be provided by resources included in system 10.

The server 12 may include electronic storage 72, one or more processors 74, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented by a cloud of computing platforms operating together as server 12.

Electronic storage 72 may comprise electronic storage media that electronically stores information. The electronic storage media of electronic storage 72 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 72 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 72 may include one or more virtual storage resources (e.g., cloud storage, a virtual private network, and/or other virtual storage resources). Electronic storage 72 may store software algorithms, information determined by processor 74, information received from server 12, information received from client computing platforms 14, and/or other information that enables server 12 to function as described herein.

Processor(s) 74 is configured to provide information processing capabilities in server 12. As such, processor 74 may include one or more of a digital processor, an analog processor, a digital circuit designed to process information, an analog circuit designed to process information, a state machine, and/or other mechanisms for electronically processing information. Although processor 74 is shown in FIG. 1 as a single entity, this is for illustrative purposes only. In some implementations, processor 74 may include a plurality of processing units. These processing units may be physically located within the same device, or processor 74 may represent processing functionality of a plurality of devices operating in coordination. The processor 74 may be configured to execute modules 16, 18, 20, 22, 24, 26, and/or 28. Processor 74 may be configured to execute modules 16, 18, 20, 22, 24, 26, and/or 28 by software; hardware; firmware; some combination of software, hardware, and/or firmware; and/or other mechanisms for configuring processing capabilities on processor 74.

It should be appreciated that although modules 16, 18, 20, 22, 24, 26, and/or 28 are illustrated in FIG. 1 as being co-located within a single processing unit, in implementations in which processor xx includes multiple processing units, one or more of modules 16, 18, 20, 22, 24, 26, and/or 28 may be located remotely from the other modules. The description of the functionality provided by the different modules 16, 18, 20, 22, 24, 26, and/or 28 described below is for illustrative purposes, and is not intended to be limiting, as any of modules 16, 18, 20, 22, 24, 26, and/or 28 may provide more or less functionality than is described. For example, one or more of modules 16, 18, 20, 22, 24, 26, and/or 28 may be eliminated, and some or all of its functionality may be provided by other ones of modules 16, 18, 20, 22, 24, 26, and/or 28. As another example, processor 74 may be configured to execute one or more additional modules that may perform some or all of the functionality attributed below to one of modules 16, 18, 20, 22, 24, 26, and/or 28.

The illustration in FIG. 1 and description herein of the client/server architecture of system 10 is not intended to be limiting. In some implementations, the electronic game described herein may be provided to a user using a peer-to-peer architecture, on a single computing platform, and/or via other configuration. For example, in a single computing platform configuration, some or all of the functionality attributed herein to modules 16, 18, 20, 22, 24, 26, and/or 28 may be provided by one or more computer program modules being executed on one or more processors of an individual computing platform. This may include, for example, a computing platform similar to or the same as client computing platforms 14.

Figure 7:
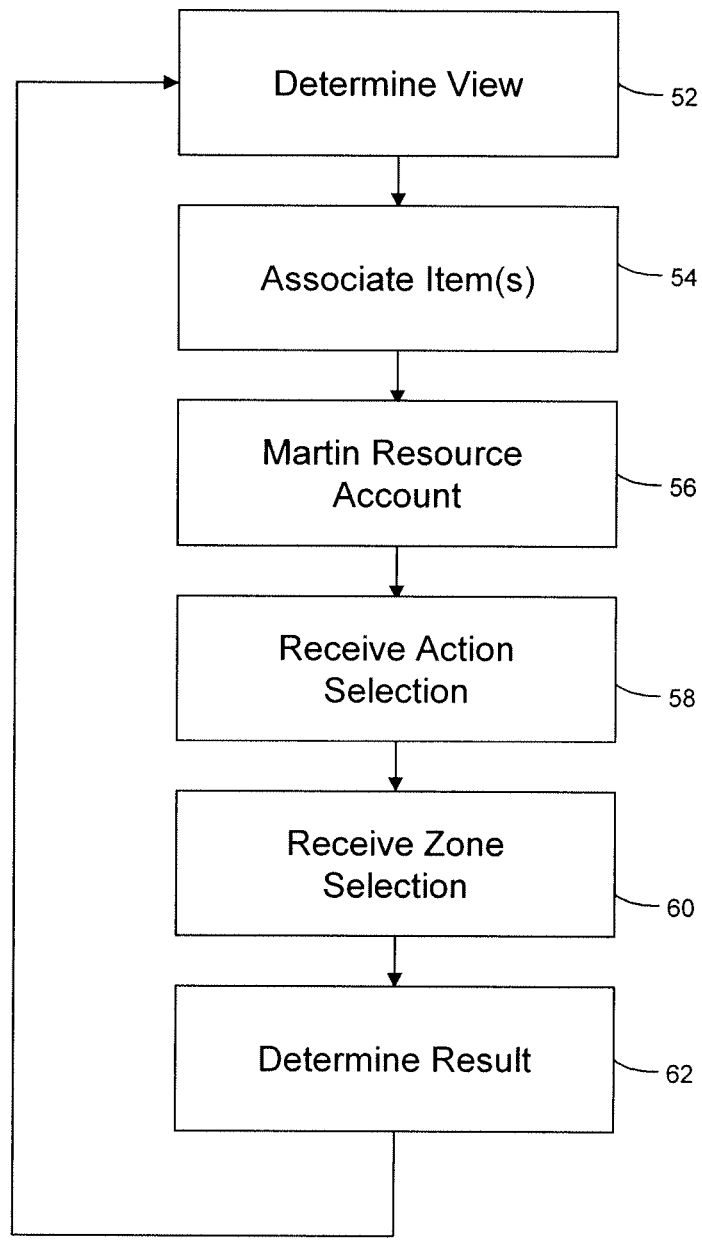
FIG. 7 illustrates a method of providing an electronic game to one or more users.

FIG. 7 illustrates a method 50 of providing an electronic game to one or more users. The operations of method 50 presented below are intended to be illustrative. In some embodiments, method 50 may be accomplished with one or more additional operations not described, and/or without one or more of the operations discussed. Additionally, the order in which the operations of method 50 are illustrated in FIG. 7 and described below is not intended to be limiting.

In some embodiments, method 50 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 50 in response to instructions stored electronically on an electronic storage medium. The one or more processing devices may include one or more devices configured through hardware, firmware, and/or software to be specifically designed for execution of one or more of the operations of method 50.

At an operation 52, a view of a game space may be determined for presentation to a user. The view may be presented to the user via a client computing platform, and/or through other presentation mechanisms. In the view, the game space may be segmented into an array of separate zones. In some implementations, operation 52 may be performed by a game module similar to or the same as game module 16 (shown in FIG. 1 and described herein).

At an operation 54, one or more discoverable items may be associated with individual zones in the game space. This may include associating one or more of the discoverable items with the zones depicted in the view of the game space determined at operation 52. This association may include a single event in which a set of items are associated with a set of zones, an ongoing association of individual items with zones, and/or other association schemes. An ongoing association of individual items may include associating items at a rate (e.g., at a frequency or with a recurring period), associating items to replace items harvested by one or more players, and/or other ongoing association schemes. In some implementations, operation 54 may be performed by an item module similar to or the same as item module 18 (shown in FIG. 1 and described herein).

At an operation 56, an accounting of a rechargeable resource available to a user and/or a user character associated with the user may be maintained. The rechargeable resource may recharge over time, responsive to performance of prescribed activities within the game space, by purchase, and/or through other mechanisms. The rechargeable resource may be expended though gameplay, and/or through other mechanisms. In some implementations, operation 56 may be performed by a resource module similar to or the same as resource module 22 (shown in FIG. 1 and described herein).

At an operation 58, selection of an action to be performed on a zone of the game space may be received. The action may have been selected by a user, or other individual or group, from among a set of potential actions. The set of potential actions may include one or more of a harvesting action, a locator action, an identifier action, and/or other actions. The different actions may be associated with different costs in the game space. The costs may include amounts of the rechargeable resource to be deducted from a user and/or user character responsive to action selection and/or performance. The actions may correspond to virtual objects or virtual tools in the game space. In some implementations, operation 58 may be performed by an action selection module similar to or the same as action selection module 24 (shown in FIG. 1 and described herein).

At an operation 60, selection of a zone of the games space may be received. The zone may have been selected by a user, or other individual or group, from the zones depicted in the view determined at operation 52. The selection of the zone may indicate the zone the selected action should be performed on. In some implementations, operation 60 may be performed by a zone selection module similar to or the same as zone selection module 26 (shown in FIG. 1 and described herein).

At an operation 62, a result of the selected action on the selected zone may be determined. The result may include collecting the cost associated with the selected action from the user in the game space, performing the selected action on the selected zone, and/or other actions. Performance of the selected action on the selected zone may impact the view of the game space determined at operation 52. For example, the view may be modified to provide a hint (determined as a function of the selected action and/or zone), to express performance of the selected action on the selected zone, and/or otherwise modified. In some implementations, operation 62 may be performed by a selection result module similar to or the same as selection result module 28 (shown in FIG. 1 and described herein).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to provide an electronic game to a user, the system comprising:
one or more processors configured to execute computer program modules, the computer program modules comprising:
a game space module configured to determine a view of a game space for presentation to a user, the game space being segmented into an array of separate zones depicted in the view of the game space;
an item module configured to associate discoverable items with individual zones;
an action selection module configured to receive selection of an action to be performed on a zone of the game space from among a set of potential actions, the set of potential actions including a harvesting action and a locator action, wherein the harvesting action is associated with a first cost of a rechargeable resource in the game space and the locator action is associated with a second cost of the rechargeable resource in the game space;
a zone selection module configured to receive selection of a zone of the games space on which the selected action should be performed; and
a selection result module configured to determine a result of the selected action on the selected zone,
wherein, responsive to the harvesting action being the selected action, the result determined by the selection result module includes collecting the first cost of the rechargeable resource from the user in the game space, and
wherein, responsive to the locator action being the selected action, the result determined by the selection result module includes collecting the second cost of the rechargeable resource from the user in the game space.

2. The system of claim 1, wherein the selection result module is further configured such that (i) responsive to the harvesting action being the selected action and an item being associated with the selected zone by the item module, the item is awarded to the user in the game space, and (ii) responsive to the locator action being the selected action, an indication is provided in the view determined by the game space module as to whether or not an item has been associated with the selected zone by the item module.

3. The system of claim 2, wherein the selection result module is further configured such that, responsive to the locator action being the selected action and an item not being associated with the selected zone, a hint is provided in the view determined by the game space module indicating another zone in the game space that has been associated with an item by the item module.

4. The system of claim 3, wherein the selection result module is configured such that the hint specifies a particular zone that has been associated with an item by the item module.

5. The system of claim 3, wherein the selection result module is configured such that the hint specifies a direction in which a zone that has been associated with an item by the item module is with respect to the selected zone.

6. The system of claim 2, wherein the selection result module is further configured such that, responsive to the harvesting action being the selected action and no item being associated with the selected zone by the item module, no item is awarded to the user in the game space.

7. The system of claim 6, wherein the game space module is configured such that, responsive to the harvesting action being the selected action, the view of the game space indicates that the selected zone has been harvested.

8. The system of claim 1, wherein the action selection module is further configured such that the set of potential actions includes an identifier action, and wherein the selection result module is further configured such that, responsive to the selected action being the identifier action and the selected zone being associated with an item by the item module, the view of the game space indicates information about the item.

9. The system of claim 1, wherein the selection result module is configured such that collecting the first cost from the user in the game space includes deducting a first amount of the rechargeable resource from an inventory of a character in the game space associated with the user, and wherein selection result module is further configured such that collecting the second cost from the user in the game space includes deducting a second amount of the rechargeable resource from the inventory of the character.

10. The system of claim 9, wherein the first amount is greater than the second amount.

11. The system of claim 1, wherein the action selection module is configured such that receiving a selection of an action to be performed on a selected zone comprises receiving selection of a virtual tool available in the game space.

12. A computer-implemented method of providing an electronic game to a user, the method being implemented by a system comprising one or more processors configured to execute computer program modules, the method comprising:
determining a view of a game space for presentation to a user, the game space being segmented into an array of separate zones depicted in the view of the game space;
associating discoverable items with individual zones in the game space;
receiving selection of an action to be performed on a zone of the game space from among a set of potential actions, the set of potential actions including a harvesting action and a locator action, wherein the harvesting action is associated with a first cost of a rechargeable resource in the game space and the locator action is associated with a second cost of the rechargeable resource in the game space;
receiving selection of a zone of the games space on which the selected action should be performed; and
determining a result of the selected action on the selected zone,
wherein, responsive to the harvesting action being the selected action, the result determined includes collecting the first cost of the rechargeable resource from the user in the game space, and
wherein, responsive to the locator action being the selected action, the result determined includes collecting the second cost of the rechargeable resource from the user in the game space.

13. The method of claim 12, wherein determining the result of the selected action on the selected zone comprises, (i) responsive to the harvesting action being the selected action and an item having been associated with the selected zone, the item being awarded to the user in the game space, or, (ii) responsive to the locator action being the selected action, an indication being provided in the view of the game space as to whether or not an item has been associated with the selected zone.

14. The method of claim 13, wherein determining the result of the selected action on the selected zone further comprises, responsive to the locator action being the selected action and an item not having been associated with the selected zone, a hint being provided in the view of the game space indicating another zone in the game space that has been associated with an item.

15. The method of claim 14, wherein the hint specifies a particular zone that has been associated with an item.

16. The method of claim 14, wherein the hint specifies a direction in which a zone that has been associated with an item is with respect to the selected zone.

17. The method of claim 13, wherein determining the result of the selected action on the selected zone further comprises, responsive to the harvesting action being the selected action and no item having been associated with the selected zone, no item being awarded to the user in the game space.

18. The method of claim 17, wherein, responsive to the harvesting action being the selected action, the view of the game space indicates that the selected zone has been harvested.

19. The method of claim 12 wherein the set of potential actions includes an identifier action, and wherein determining the result of the selected action on the selected zone further comprises, responsive to the selected action being the identifier action and the selected zone that has been associated with an item, the view of the game space indicates information about the item.

20. The method of claim 12, wherein collecting the first cost from the user in the game space includes deducting a first amount of the rechargeable resource from an inventory of a character in the game space associated with the user, and wherein collecting the second cost from the user in the game space includes deducting a second amount of the rechargeable resource from the inventory of the character.

21. The method of claim 20, wherein the first amount is greater than the second amount.

22. The method of claim 12, wherein receiving a selection of an action to be performed on a selected zone comprises receiving selection of a virtual tool available in the game space.

* * * * *